(12) United States Patent
Gelda et al.

(10) Patent No.: US 11,922,422 B2
(45) Date of Patent: Mar. 5, 2024

(54) SYSTEM, METHOD, AND COMPUTER PROGRAM PRODUCT FOR DETERMINING FRAUD

(71) Applicant: Visa International Service Association, San Francisco, CA (US)

(72) Inventors: Dhruv Gelda, Mountain View, CA (US); Shubham Jain, Mountain View, CA (US); Andrew Malachy McGloin, Granite Bay, CA (US); Wei Zhang, Fremont, CA (US); Hao Yang, San Jose, CA (US); Liang Wang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/781,209

(22) PCT Filed: Nov. 5, 2021

(86) PCT No.: PCT/US2021/058151
§ 371 (c)(1),
(2) Date: May 31, 2022

(87) PCT Pub. No.: WO2022/108767
PCT Pub. Date: May 27, 2022

(65) Prior Publication Data
US 2022/0414665 A1    Dec. 29, 2022

Related U.S. Application Data

(60) Provisional application No. 63/114,604, filed on Nov. 17, 2020.

(51) Int. Cl.
*G06Q 20/40* (2012.01)

(52) U.S. Cl.
CPC ....... *G06Q 20/4016* (2013.01); *G06Q 20/407* (2013.01)

(58) Field of Classification Search
CPC .................. G06Q 20/4016; G06Q 20/407
(Continued)

(56) References Cited

U.S. PATENT DOCUMENTS 9,560,027 B1    1/2017  Kolman et al.
9,652,772 B1 *  5/2017  Eyges ................ G06Q 20/4016
(Continued)

FOREIGN PATENT DOCUMENTS

CN    108133372 A    6/2018
CN    108537671 A    9/2018
(Continued)

OTHER PUBLICATIONS

Carneiro et al., "A data mining based system for credit-card fraud detection in e-tail", Decision Support Systems 95, Feb. 15, 2016, 19 pages.

*Primary Examiner* — Lindsay M Maguire
(74) *Attorney, Agent, or Firm* — The Webb Law Firm

(57) ABSTRACT

A method of determining fraud includes: receiving a transaction request associated with a first payment transaction between a merchant and a user from a merchant system; generating a first risk score based on the transaction request and a first set pot of transaction data received prior to the transaction request; processing a transaction request approval based on the first risk score not satisfying a first threshold; receiving a risk score request associated with the first payment transaction, where the risk score request is received after the transaction request has been approved; generating a second risk score based on a second set of transaction data received after the first risk score is determined; and automatically classifying the first payment trans-
(Continued)

action as potentially fraudulent in response to determining that the second risk score satisfies a second threshold.

27 Claims, 12 Drawing Sheets

(58) Field of Classification Search
USPC .......................................................... 705/44
See application file for complete search history.

(56) References Cited

U.S. PATENT DOCUMENTS

| | | |
|---|---|---|
| 2010/0228656 A1 | 9/2010 | Wasserblat et al. |
| 2010/0305993 A1 | 12/2010 | Fisher |
| 2012/0130897 A1 | 5/2012 | Chisholm |
| 2015/0178735 A1 | 6/2015 | Liu et al. |
| 2017/0148024 A1* | 5/2017 | Yu ..................... G06Q 20/4016 |
| 2018/0101852 A1* | 4/2018 | Liu ....................... G06Q 20/40 |
| 2020/0065813 A1 | 2/2020 | Walters et al. |
| 2020/0111037 A1 | 4/2020 | Mondal |
| 2020/0160232 A1 | 5/2020 | Saleh et al. |

FOREIGN PATENT DOCUMENTS

| | | |
|---|---|---|
| CN | 110111106 A | 8/2019 |
| CN | 111815328 A | 10/2020 |

* cited by examiner

|  | FPR | Production (VAA) | Uni-directional (v1) | Bi-directional (v2) |
|---|---|---|---|---|
| Merchant 1 | 10-20 | 0.04 | 0.215 (5.4x) | 0.422 (10.5x) |
| Merchant 2 | 10-20 | 0.334 | 0.653 (2.0x) | 0.675 (2.0x) |
| Merchant 3 | 10-20 | NA | 0.105 | 0.179 |
| Merchant 4 | 10-20 | NA | 0.228 | 0.556 |
| Merchant 5 | 10-20 | NA | 0.267 | 0.362 |
| Merchant 6 | 10-20 | 0.216 | 0.759 (3.5x) | 0.844 (3.9x) |
| Merchant 7 | 10-20 | 0.216 | 0.433 (2.0x) | 0.844 (3.9x) |
| Merchant 8 | 10-20 | 0.41 | 0.677 (1.7x) | 0.872 (2.1x) |

SYSTEM, METHOD, AND COMPUTER PROGRAM PRODUCT FOR DETERMINING FRAUD

CROSS REFERENCE TO RELATED APPLICATIONS

This application is the U.S. national phase of International Application No. PCT/US2021/058151 filed Nov. 5, 2021, and claims priority to U.S. Provisional Patent Application No. 63/114,604, filed Nov. 17, 2020, the disclosures of which are incorporated herein by reference in their entirety.

BACKGROUND

1. Field

This disclosure relates generally to determining fraud and, in some non-limiting embodiments or aspects, to systems, methods, and computer program products for determining fraud.

2. Technical Considerations

Rapid advancements in the payment gateway technology for e-commerce businesses have made it faster and easier for consumers to shop online. According to Internet retailer data, the online retail purchases in the United States increased by 16 percent in 2017 ($453.46B) compared to 2016 ($390.99B). However, the ease of use of online payments has also attracted scammers to exploit vulnerabilities in the payment ecosystem. In fact, online fraud attacks increased by 30 percent in 2017 (compared to 2016), nearly twice as fast as the growth rate of retail e-commerce sales. Therefore, it has become progressively more important to develop sophisticated fraud detection models to detect and/or prevent online fraud.

SUMMARY

According to some non-limiting embodiments or aspects, a method of determining fraud includes: receiving, from a merchant system and with at least one processor, a transaction request associated with a first payment transaction between a merchant and a user; generating, with at least one processor, a first risk score based on the transaction request and a first set of transaction data received prior to the transaction request; processing a transaction request approval, with at least one processor, based on the first risk score not satisfying a first threshold; receiving, with at least one processor and from the merchant system or a separate merchant system, a risk score request associated with the first payment transaction, where the risk score request is received after the transaction request has been approved; generating, with at least one processor, a second risk score based on a second set of transaction data received after the first risk score is determined; and automatically classifying, with at least one processor, the first payment transaction as potentially fraudulent in response to determining that the second risk score satisfies a second threshold.

In some non-limiting embodiments or aspects, the second risk score may be generated based on inputting the first set of transaction data and the second set of transaction data into a machine-learning model. The machine-learning model may include a bi-directional recurrent neural network. The bi-directional recurrent neural network may include long short-term memory or gated recurrent unit cells. The first set of transaction data may include transaction data associated with transactions of the user processed prior to initiation of the first payment transaction. The second set of transaction data may include transaction data associated with transactions of the user processed after initiation of the first payment transaction. The risk score request may be received prior to merchant fulfillment of the first payment transaction. The method may include: in response to classifying the first payment transaction as potentially fraudulent, automatically causing the first payment transaction to be canceled. The method may include: in response to classifying the first payment transaction as potentially fraudulent, automatically causing fulfillment of a product or service associated with the first payment transaction to be delayed and/or revoked. The method may include: in response to classifying the first payment transaction as potentially fraudulent, automatically communicating a verification request to a device associated with the user to cause the user to indicate whether the first payment transaction is fraudulent.

According to some non-limiting embodiments or aspects, a system for determining fraud includes at least one processor programmed or configured to: receive, from a merchant system, a transaction request associated with a first payment transaction between a merchant and a user; generate a first risk score based on the transaction request and a first set of transaction data received prior to the transaction request; process a transaction request approval based on the first risk score not satisfying a first threshold; receive, from the merchant system or a separate merchant system, a risk score request associated with the first payment transaction, where the risk score request is received after the transaction request has been approved; generate a second risk score based on a second set of transaction data received after the first risk score is determined; and automatically classify the first payment transaction as potentially fraudulent in response to determining that the second risk score satisfies a second threshold.

In some non-limiting embodiments or aspects, the second risk score may be generated based on inputting the first set of transaction data and the second set of transaction data into a machine-learning model. The machine-learning model may include a bi-directional recurrent neural network. The bi-directional recurrent neural network may include long short-term memory or gated recurrent unit cells. The first set of transaction data may include transaction data associated with transactions of the user processed prior to initiation of the first payment transaction. The second set of transaction data may include transaction data associated with transactions of the user processed after initiation of the first payment transaction. The risk score request may be received prior to merchant fulfillment of the first payment transaction. The at least one processor may be programmed or configured to: in response to classifying the first payment transaction as potentially fraudulent, automatically cause the first payment transaction to be canceled. The at least one processor may be programmed or configured to: in response to classifying the first payment transaction as potentially fraudulent, automatically cause fulfillment of a product or service associated with the first payment transaction to be delayed and/or revoked. The at least one processor may be programmed or configured to: in response to classifying the first payment transaction as potentially fraudulent, automatically communicate a verification request to a device associated with the user to cause the user to indicate whether the first payment transaction is fraudulent.

According to some non-limiting embodiments or aspects, a computer program product for determining fraud includes at least one non-transitory computer-readable medium including program instructions that, when executed by at least one processor, cause the at least one processor to: receive, from a merchant system, a transaction request associated with a first payment transaction between a merchant and a user; generate a first risk score based on the transaction request and a first set of transaction data received prior to the transaction request; process a transaction request approval based on the first risk score not satisfying a first threshold; receive, from the merchant system or a separate merchant system, a risk score request associated with the first payment transaction, where the risk score request is received after the transaction request has been approved; generate a second risk score based on a second set of transaction data received after the first risk score is determined; and automatically classify the first payment transaction as potentially fraudulent in response to determining that the second risk score satisfies a second threshold.

In some non-limiting embodiments or aspects, the second risk score may be generated based on inputting the first set of transaction data and the second set of transaction data into a machine-learning model. The machine-learning model may include a bi-directional recurrent neural network. The bi-directional recurrent neural network may include long short-term memory or gated recurrent unit cells. The first set of transaction data may include transaction data associated with transactions of the user processed prior to initiation of the first payment transaction. The second set of transaction data may include transaction data associated with transactions of the user processed after initiation of the first payment transaction. The risk score request may be received prior to merchant fulfillment of the first payment transaction. The program instructions, when executed by at least one processor, may cause the at least one processor to: in response to classifying the first payment transaction as potentially fraudulent, automatically cause the first payment transaction to be canceled. The program instructions, when executed by at least one processor, may cause the at least one processor to: in response to classifying the first payment transaction as potentially fraudulent, automatically cause fulfillment of a product or service associated with the first payment transaction to be delayed and/or revoked. The program instructions, when executed by at least one processor, may cause the at least one processor to: in response to classifying the first payment transaction as potentially fraudulent, automatically communicate a verification request to a device associated with the user to cause the user to indicate whether the first payment transaction is fraudulent.

Further non-limiting embodiments or aspects are set forth in the following numbered clauses:

Clause 1: A method of determining fraud, comprising: receiving, from a merchant system and with at least one processor, a transaction request associated with a first payment transaction between a merchant and a user; generating, with at least one processor, a first risk score based on the transaction request and a first set of transaction data received prior to the transaction request; processing a transaction request approval, with at least one processor, based on the first risk score not satisfying a first threshold; receiving, with at least one processor and from the merchant system or a separate merchant system, a risk score request associated with the first payment transaction, wherein the risk score request is received after the transaction request has been approved; generating, with at least one processor, a second risk score based on a second set of transaction data received after the first risk score is determined; and automatically classifying, with at least one processor, the first payment transaction as potentially fraudulent in response to determining that the second risk score satisfies a second threshold.

Clause 2: The method of clause 1, wherein the second risk score is generated based on inputting the first set of transaction data and the second set of transaction data into a machine-learning model.

Clause 3: The method of clause 1 or 2, wherein the machine-learning model comprises a bi-directional recurrent neural network.

Clause 4: The method of any of clauses 1 to 3, wherein the bi-directional recurrent neural network comprises long short-term memory or gated recurrent unit cells.

Clause 5: The method of any of clauses 1 to 4, wherein the first set of transaction data comprises transaction data associated with transactions of the user processed prior to initiation of the first payment transaction.

Clause 6: The method of any of clauses 1 to 5, wherein the second set of transaction data comprises transaction data associated with transactions of the user processed after initiation of the first payment transaction.

Clause 7: The method of any of clauses 1 to 6, wherein the risk score request is received prior to merchant fulfillment of the first payment transaction.

Clause 8: The method of any of clauses 1 to 7, further comprising: in response to classifying the first payment transaction as potentially fraudulent, automatically causing the first payment transaction to be canceled.

Clause 9: The method of any of clauses 1 to 8, further comprising: in response to classifying the first payment transaction as potentially fraudulent, automatically causing fulfillment of a product or service associated with the first payment transaction to be delayed and/or revoked.

Clause 10: The method of any of clauses 1 to 9, further comprising: in response to classifying the first payment transaction as potentially fraudulent, automatically communicating a verification request to a device associated with the user to cause the user to indicate whether the first payment transaction is fraudulent.

Clause 11: A system for determining fraud, comprising at least one processor programmed or configured to: receive, from a merchant system, a transaction request associated with a first payment transaction between a merchant and a user; generate a first risk score based on the transaction request and a first set of transaction data received prior to the transaction request; process a transaction request approval based on the first risk score not satisfying a first threshold; receive, from the merchant system or a separate merchant system, a risk score request associated with the first payment transaction, wherein the risk score request is received after the transaction request has been approved; generate a second risk score based on a second set of transaction data received after the first risk score is determined; and automatically classify the first payment transaction as potentially fraudulent in response to determining that the second risk score satisfies a second threshold.

Clause 12: The system of clause 11, wherein the second risk score is generated based on inputting the first set of transaction data and the second set of transaction data into a machine-learning model.

Clause 13: The system of clause 11 or 12, wherein the machine-learning model comprises a bi-directional recurrent neural network.

Clause 14: The system of any of clauses 11 to 13, wherein the bi-directional recurrent neural network comprises long short-term memory or gated recurrent unit cells.

Clause 15: The system of any of clauses 11 to 14, wherein the first set of transaction data comprises transaction data associated with transactions of the user processed prior to initiation of the first payment transaction.

Clause 16: The system of any of clauses 11 to 15, wherein the second set of transaction data comprises transaction data associated with transactions of the user processed after initiation of the first payment transaction.

Clause 17: The system of any of clauses 11 to 16, wherein the risk score request is received prior to merchant fulfillment of the first payment transaction.

Clause 18: The system of any of clauses 11 to 17, wherein the at least one processor is programmed or configured to: in response to classifying the first payment transaction as potentially fraudulent, automatically cause the first payment transaction to be canceled.

Clause 19: The system of any of clauses 11 to 18, wherein the at least one processor is programmed or configured to: in response to classifying the first payment transaction as potentially fraudulent, automatically cause fulfillment of a product or service associated with the first payment transaction to be delayed and/or revoked.

Clause 20: The system of any of clauses 11 to 19, wherein the at least one processor is programmed or configured to: in response to classifying the first payment transaction as potentially fraudulent, automatically communicate a verification request to a device associated with the user to cause the user to indicate whether the first payment transaction is fraudulent.

Clause 21: A computer program product for determining fraud comprising at least one non-transitory computer-readable medium including program instructions that, when executed by at least one processor, cause the at least one processor to: receive, from a merchant system, a transaction request associated with a first payment transaction between a merchant and a user; generate a first risk score based on the transaction request and a first set of transaction data received prior to the transaction request; process a transaction request approval based on the first risk score not satisfying a first threshold; receive, from the merchant system or a separate merchant system, a risk score request associated with the first payment transaction, wherein the risk score request is received after the transaction request has been approved; generate a second risk score based on a second set of transaction data received after the first risk score is determined; and automatically classify the first payment transaction as potentially fraudulent in response to determining that the second risk score satisfies a second threshold.

Clause 22: The computer program product of clause 21, wherein the second risk score is generated based on inputting the first set of transaction data and the second set of transaction data into a machine-learning model.

Clause 23: The computer program product of clause 21 or 22, wherein the machine-learning model comprises a bi-directional recurrent neural network.

Clause 24: The computer program product of any of clauses 21 to 23, wherein the bi-directional recurrent neural network comprises long short-term memory or gated recurrent unit cells.

Clause 25: The computer program product of any of clauses 21 to 24, wherein the first set of transaction data comprises transaction data associated with transactions of the user processed prior to initiation of the first payment transaction.

Clause 26: The computer program product of any of clauses 21 to 25, wherein the second set of transaction data comprises transaction data associated with transactions of the user processed after initiation of the first payment transaction.

Clause 27: The computer program product of any of clauses 21 to 26, wherein the risk score request is received prior to merchant fulfillment of the first payment transaction.

Clause 28: The computer program product of any of clauses 21 to 27, wherein the program instructions, when executed by at least one processor, cause the at least one processor to: in response to classifying the first payment transaction as potentially fraudulent, automatically cause the first payment transaction to be canceled.

Clause 29: The computer program product of any of clauses 21 to 28, wherein the program instructions, when executed by at least one processor, cause the at least one processor to: in response to classifying the first payment transaction as potentially fraudulent, automatically cause fulfillment of a product or service associated with the first payment transaction to be delayed and/or revoked.

Clause 30: The computer program product of any of clauses 21 to 29, wherein the program instructions, when executed by at least one processor, cause the at least one processor to: in response to classifying the first payment transaction as potentially fraudulent, automatically communicate a verification request to a device associated with the user to cause the user to indicate whether the first payment transaction is fraudulent.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
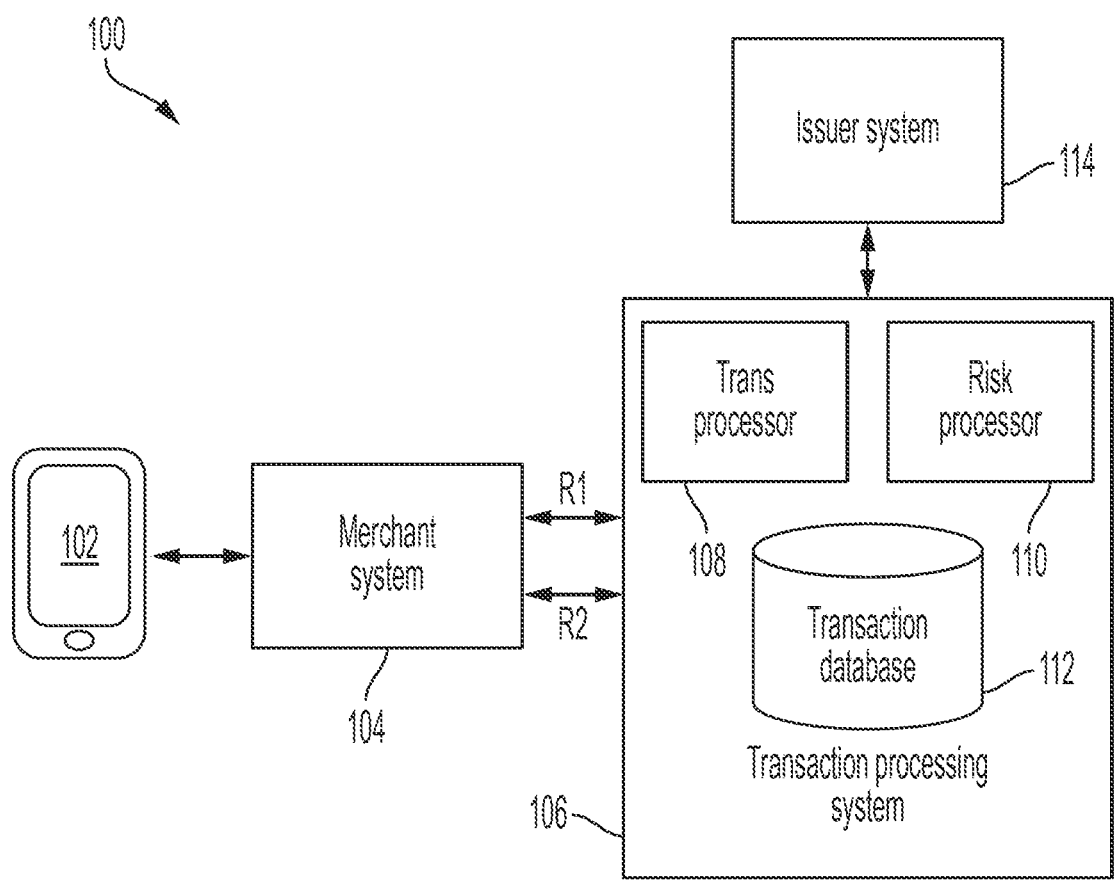
FIG. 1 shows a schematic diagram of a system for determining fraud, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account data" refers to any data concerning one or more accounts for one or more users. Account data may include, for example, one or more account identifiers, user identifiers, transaction histories, balances, credit limits, issuer institution identifiers, and/or the like.

As used herein, the term "account identifier" may refer to one or more types of identifiers associated with an account (e.g., a primary account number (PAN) associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the term "card-present transaction" may refer to a payment transaction initiated with a payment device in which the cardholder physically presents the payment device at the time the payment transaction is initiated with the payment device. A non-limiting example of a card-present transaction is a payment transaction initiated at a brick-and-mortar retail store with a physical point-of-sale (POS) system, during which the cardholder physically presents the payment device to the merchant.

As used herein, the term "card-not-present transaction" or "CNP transaction" may refer to a payment transaction initiated with a payment device in which the cardholder does not or cannot physically present the payment device at the time the payment transaction is initiated with the payment device. Non-limiting examples of CNP transactions include transactions initiated by mail or facsimile or a payment transaction initiated over the telephone or the internet.

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as POS devices and/or POS systems used by a merchant. In some non-limiting embodiments, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, personal digital assistants (PDAs), wearable devices, such as watches, glasses, lenses, and/or clothing, and/or the like), and/or other like devices. Moreover, the term "client" may also refer to an entity, such as a merchant, that owns, utilizes, and/or operates a client device for facilitating payment transactions with a transaction service provider.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit.

This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as one or more displays, processors, memory, input devices, network interfaces, and/or the like. The computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. The computing device may be a non-mobile device, such as a desktop computer. An "interface" refers to a generated display, such as one or more graphical user interfaces (GUIs) with which a user may interact, either directly or indirectly (e.g., through a keyboard, mouse, etc.).

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a PAN, to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

The term "processor," as used herein, may represent any type of processing unit, such as a single processor having one or more cores, one or more cores of one or more processors, multiple processors each having one or more cores, and/or other arrangements and combinations of processing units. Reference to "at least one processor" can refer to a previously-recited processor or a different processor.

As used herein, the term "server" may refer to or include one or more computing devices that are operated by or facilitate communication and processing for multiple parties in a network environment, such as the internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server," "the server," "at least one processor," or "the at least one processor," or the like, as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include at least one processor and, in some non-limiting embodiments or aspects, may be operated by or on behalf of a transaction service provider.

Some non-limiting embodiments or aspects are described herein in connection with thresholds. As used herein, satisfying a threshold may refer to a value being greater than the threshold, greater than or equal to the threshold, less than the threshold, less than or equal to the threshold, equal to the threshold, or the like.

Non-limiting embodiments or aspects improve existing systems for determining transaction fraud by enhancing the ability to detect and prevent transaction fraud associated with electronic payment transactions. Transaction fraud is detected using an unconventional transaction processing flow that includes a risk score request configured to cause the generation of a second risk score after the original transaction request has been approved. The first risk score may have been associated with the initial authorization of the transaction. The risk score request may be generated and communicated to the transaction processing system prior to completion (e.g., fulfillment) of the electronic payment transaction such that fraud is detected prior to completion of the electronic payment transaction. The improved system architecture utilizing the second risk score allows for a more accurate and earlier determination as to whether an electronic payment transaction is fraudulent. The system also performs an unconventional analysis of transaction data to generate the second risk score and detect fraud by analyzing transactions initiated after the initial transaction and/or initial authorization/approval thereof. Analyzing transactions after the initial transaction and/or authorization/approval to generate the second risk score enables the system to detect that a fraudulent "burst" of transactions has been conducted by a fraudster on behalf of the user, which may not have been evident based only on the first transaction(s) of the fraudulent burst of transactions.

Further, non-limiting embodiments cause the system to verify with the user that an electronic payment transaction classified as potentially fraudulent based on the second risk score is actually fraudulent or non-fraudulent. This allows for non-fraudulent transactions to continue to completion without being automatically canceled on the basis of the fraud determination from the second risk score or to confirm the fraud determination. Non-limiting embodiments or aspects further technically improve the fraud determination systems by including a machine-learning model to generate the first and second risk scores, such as a bi-directional neural network comprising long short-term memory or gated recurrent unit cells, which may enhance the accuracy of the fraud determination. The machine-learning model uses different transaction data to generate the first risk score and the second risk score, so that the second risk score analyzes data not available thereto at the time the first risk score was generated.

Referring to FIG. 1, a system 100 is shown for determining fraud according to some non-limiting embodiments or aspects. The system 100 may include a user device 102 which may be a computing device associated with a user. The user may conduct electronic payment transactions for goods and/or services with at least one merchant. The user device 102 may initiate a payment transaction between the user and merchant using a payment device of the user stored on the user device 102 (such as in an electronic wallet) by communicating a transaction message to a merchant system 104 associated with the merchant. The user device 102 may be any form of payment device, which may include a physical payment instrument (e.g., credit and/or debit card). The merchant system 104 may include at least one POS device and/or POS system. The payment transaction between the user and the merchant may be a card-present or a card-not-present transaction. The payment transaction between the user and the merchant may be an e-commerce transaction.

In some non-limiting embodiments or aspects, in response to receiving the transaction message, the merchant system 104 may generate a transaction request to initiate processing of the payment transaction. The merchant system 104 may communicate ($R_1$) the transaction request to a transaction processing system 106 to cause an authorization decision to be generated for the payment transaction. The transaction processing system 106 may be associated with the transaction service provider of the payment device used by the user to initiate the payment transaction. The authorization decision may be to authorize, decline, authorize in part, and/or decline in part the payment transaction.

With continued reference to FIG. 1, in some non-limiting embodiments or aspects, the transaction processing system 106 may comprise a transaction processor 108, a risk processor 110, and/or a transaction database 112. The transaction processor 108 may be a single or multiple processors. The risk processor 110 may be a single or multiple processors. The transaction processor 108 and the risk processor 110 may be the same or separate processors.

The transaction processor 108 may communicate with the merchant system 104 and an issuer system 114 (associated with the issuer of the user's payment device) as part of a payment processing network to process the payment transaction, including causing the generation of the authorization decision, for example, by the issuer system 114. The transaction processor 108 may generate an authorization request in response to the received transaction request. The transaction processor 108 may communicate the authorization request to the issuer system 114 to cause the issuer system 114 to generate the authorization decision. The transaction processor 108 may receive an authorization response from the issuer system 114, the authorization response comprising a field containing the authorization decision (e.g., in the form of an indicator). The transaction processor 108 may communicate the authorization response to the merchant system 104 and/or the user device 102.

With continued reference to FIG. 1, in some non-limiting embodiments or aspects, the transaction database 112 of the transaction processing system 106 may store transaction data associated with payment transactions processed by the transaction processing system 106 both for the user and other users. This transaction data may include a first set of transaction data associated with payment transactions received and/or processed prior to receipt of the transaction request. This first set of transaction data may include transaction data associated with payment transactions received and/or processed by the transaction processing system 106 prior to receipt of the transaction request involving the same user and/or merchant. Transaction data may comprise data to be used to authorize, clear, settle and/or fulfill electronic payment transactions, such as data elements specified in ISO 8583; however, the transaction data may comprise other data elements associated with electronic payment transactions that, considered alone or in combination with other data elements, may indicate potential fraud. As used herein, a "potentially fraudulent transaction" refers to a transaction associated with one or more data elements that may indicate it may be a fraudulent transaction. For example, a potentially fraudulent transaction may be a transaction associated with one or more data elements including one or more values that satisfy a threshold indicating possible fraud.

In some non-limiting embodiments or aspects, the risk processor 110 may generate a first risk score (interchangeably referred to herein as an authorization score $r_a$) in response to the transaction processing system 106 receiving the transaction request from the merchant system 104. The first risk score may be generated based on transaction data contained in the transaction request (associated with the payment transaction) and the first set of transaction data stored in the transaction database 112 (e.g., transaction data already received by the transaction processing system 106 and stored in the transaction database 112 from previously-processed transactions), including transaction data stored thereon associated with the user and/or other users. In some non-limiting embodiments or aspects, the first risk score may be included as a field in the authorization request to the issuer system 114, which the issuer system 114 may use to generate the authorization decision.

The risk scores described herein (e.g., the first and second risk scores) may be generated in any suitable format, such as a numeric risk score (e.g., risk score between 1 and 100 where 1 is lowest risk and 100 is highest risk), an alphabetic risk score (e.g., a grade in which A is lowest risk and F is highest risk), or any other format suitable for rating a fraud risk associated with the payment transaction. The risk scores may be generated by the transaction processing system 106 in near real-time relative to the message requesting generation thereof. For example, the first risk score may be generated in near real-time relative to the transaction processing system 106 receiving the transaction request. The second risk score may be generated in near real-time relative to the transaction processing system 106 receiving the risk score request.

With continued reference to FIG. 1, in some non-limiting embodiments or aspects, the transaction processing system 106 may analyze the generated first risk score (from the risk processor 110) to determine whether to approve or deny the transaction. This may be a separate determination from the issuer's authorization decision and may be an additional approval (beyond the issuer's authorization decision) required for processing of the payment transaction to proceed. Additionally or alternatively, the issuer system 114 may determine whether to approve or deny the transaction, with the decision being the same as the authorization decision (e.g., authorize/approve or deny/decline), and the issuer system 114 may base the authorization decision, at least in part, on the first risk score. It will be appreciated that in some non-limiting embodiments or aspects, the transaction service provider and issuer may be the same entity such that a single authorization/approval is generated based on the first risk score.

In some non-limiting embodiments or aspects, the transaction processing system 106 and/or the issuer system 114 may authorize/approve the transaction in response to determining that the first risk score does not satisfy a first threshold (e.g., the risk score is lower than a minimum risk score threshold associated with potentially fraudulent payment transactions). The transaction processing system 106 may continue processing of the transaction in response to the determination by the transaction processing system 106 and/or the issuer system 114 that the first risk score does not satisfy a first threshold. The transaction processing system 106 and/or the issuer system 114 may deny/decline the transaction request in response to determining that the first risk score satisfies a first threshold (e.g., the risk score is higher than a minimum risk score threshold associated with potentially fraudulent payment transactions). The transaction processing system 106 may automatically terminate processing of the transaction in response to the determination by the transaction processing system 106 and/or the issuer system 114 that the first risk score satisfies a first threshold.

The transaction processing system 106 (e.g., the transaction processor 108) may generate and communicate a transaction response to the merchant system 104, which transaction response may comprise a field containing an indicator that the payment transaction is authorized/approved or denied/declined based on the first risk score. The transaction response may comprise a field containing the first risk score.

In response to the transaction processing system 106 and/or the issuer system 114 denying the payment transaction based on the first risk score, the transaction processing system 106 and/or the merchant system 104 and/or the issuer system 114 may terminate the payment transaction. In response to the transaction processing system 106 and/or the issuer system 114 denying the payment transaction based on the first risk score, the transaction processing system 106 and/or the merchant system 104 and/or the issuer system 114 may communicate a verification request to the user device 102 to cause the user device 102 to indicate whether the payment transaction is actually fraudulent.

In response to the transaction processing system 106 and/or the issuer system 114 approving/authorizing the payment transaction based on the first risk score, the transaction processing system 106 may cause the merchant system 104 to continue processing the transaction by communicating the transaction response comprising the approval/authorization to the merchant system 104. In response to receiving the transaction response comprising the approval/authorization, the merchant system 104 may continue processing of the transaction, which may include initiating clearing and/or settlement of the transaction and/or preparing the transaction for fulfillment. Preparing the transaction for fulfillment may comprise preparing the product associated with the transaction for shipment or delivery to the user. Preparing the transaction for fulfillment may comprise preparing to provide the service to the user. For subscription-based services (e.g., software services), preparing the transaction for fulfillment may comprise generating user access credentials.

With continued reference to FIG. 1, at a time after approval of the transaction request, the merchant system 104 (or a separate merchant system) may generate a risk score request. The separate merchant system may be a fulfillment merchant who prepares purchased products/services for fulfillment to the user on behalf of a selling merchant, who offers the products/services for purchase. The merchant system 104 may communicate ($R_2$) the risk score request to the transaction processing system 106 to cause the risk processor 110 to generate a second risk score associated with the same payment transaction. The risk score request may be generated and communicated prior to merchant fulfillment of the first payment transaction (e.g., before the product has been shipped and/or delivered to the consumer, before the consumer has been granted access to the product or service, and the like). Additionally, or alternatively, the risk score request may be generated and communicated prior to some other predetermined time period (different from the merchant fulfillment) during which reversal of the transaction is still feasible. For example, for subscription-based software services the predetermined time period may be after the consumer has been granted access to the services, which may be granted near real-time with the transaction approval, and in such cases, the transaction may be revoked or otherwise canceled by at least temporarily revoking user access. The time period between initiation and/or approval of a transaction and fulfillment of the transaction may be on the order of hours or days. For example, the time period between initiation and/or approval of a transaction and fulfillment of the transaction may be at least 1 hour, at least 2 hours, at least 6 hours, at least 12 hours, at least 1 day, at least 2 days, at least 3 days, or at least 5 days. The time period between initiation and/or approval of a transaction and fulfillment of the transaction may be less than 1 week, for example. The time periods between initiation and/or approval of a transaction and fulfillment of the transaction may enable the system to identify potentially fraudulent transactions before fulfillment is completed using the second risk score.

In response to receiving the risk score request, the risk processor 110 may generate a second risk score (interchangeably referred to herein as a fulfillment score $r_f$) based on a second set of transaction data received after the first risk score is determined. The second set of transaction data may include transaction data associated with transactions of the user processed after initiation of the first payment transaction, which were added to the transaction database 112 after initiation of the first payment transaction. Therefore, this second set of transaction data may include data associated with transactions not included in the first set of transaction data. The second risk score may utilize both the first and second sets of transaction data. The second risk score may be generated based on an algorithm, which algorithm differently weights the first and second sets of transaction data. For example, the second set of transaction data may be more heavily weighted in the algorithm compared to the first set of transaction data due to its temporal proximity to the first payment transaction and/or the time the risk score request was generated.

In some non-limiting embodiments or aspects, the first and/or the second risk scores maybe be generated by inputting the transaction data (e.g., the first set and/or second set of transaction data) into a machine-learning model. The machine-learning model may include a bi-directional recurrent neural network. The bi-directional recurrent neural network may include asymmetric forward/backward states. The machine-learning model may be trained using historical transaction data comprising payment transactions previously processed by the transaction processing system 106. The machine-learning model may be modified over time using, for example, a quadratic loss function to increase performance thereof based on ongoing processing of transactions.

The bi-directional recurrent neural network may be implemented using a bi-directional recurrent neural network with long short-term memory (LSTM) or gated recurrent unit (Bi-GRU). Such network architectures may include two non-interacting hidden units referred to as the forward and backward recurrent neural network layers. The two layers may be differentiated such that the temporal information flows in opposite directions, such as positive for the forward recurrent neural network and negative for the backward recurrent neural network. This configuration enables the network to exploit input information from both past and future transactions. For each transaction, an input vector $x_t$ fed to the network may be a simple concatenation of merchant embedding ($m_i$), user embedding ($u_i$) and relevant transaction information (e.g., dollar amount, geolocation, time stamp, transaction velocities, and the like). Given the input features $x_t$ for a transaction at time t, the fraud probability $y_t$ may then be obtained by concatenating the forward and backward hidden states and passing through a non-linear sigma function.

The bi-directional recurrent neural network architecture provides improvements and benefits over other models for detecting payment transaction fraud. Based on analyzing historical transaction data, recurrent patterns indicating fraud may be identified based on a common fraud pattern of: (i) a scammer obtaining account information of a payment device, (ii) a transaction of a relatively small amount being placed by the scammer to confirm validity of the card, and (iii) multiple transactions of relatively large amounts being placed within a short time window at the same or different merchants. Further, fraudulent transactions commonly peak during nocturnal hours and plummet during workday hours, making it difficult for a user to self-report payment device theft. Bi-directional recurrent neural networks can include a feedback mechanism that enables detection of suspicious behavior according to the above-described pattern quickly, enabling mitigating action to be taken earlier. Thus, including the machine-learning model (e.g., a bi-directional recurrent neural network) in the payment transaction process can significantly improve the effectiveness of detecting payment transaction fraud.

With continued reference to FIG. 1, in some non-limiting embodiments or aspects, the transaction processing system 106 may continue to classify the transaction as non-fraudulent in response to determining that the second risk score does not satisfy a second threshold (e.g., the second risk score is lower than a minimum risk score threshold associated with potentially fraudulent payment transactions). The second threshold may be the same or different from the first threshold. The transaction processing system 106 may communicate a risk score response to the merchant system 104, the risk score response comprising a field (e.g., a parameter value) indicating the classification of the transaction as still non-fraudulent to cause the merchant system to fulfill the transaction. The risk score response may comprise a field containing the second risk score.

With continued reference to FIG. 1, in some non-limiting embodiments or aspects, the transaction processing system 106 may update the classification of the transaction to potentially fraudulent in response to determining that the second risk score satisfies the second threshold (e.g., the second risk score is higher than a minimum risk score threshold associated with potentially fraudulent payment transactions).

The transaction processing system 106 may communicate a risk score response to the merchant system 104, comprising a field indicating the classification of the transaction as potentially fraudulent. The risk score response may comprise a field containing the second risk score.

In some non-limiting embodiments or aspects, in response to the transaction being classified as potentially fraudulent based on the second risk score, the transaction processing system 106 and/or the merchant system 104 may generate and communicate a verification request to the user device 102 (a fraud risk mitigation action) to cause the user (via the user device 102) to indicate whether the payment transaction is fraudulent. The user indicating that the payment transaction is fraudulent may cause the payment transaction to be canceled (e.g., irreversibly terminated) and not fulfilled. The user indicating that the payment transaction is non-fraudulent may cause the payment transaction to be fulfilled and the status of the payment transaction to be reclassified to non-fraudulent.

In some non-limiting embodiments or aspects, in response to the transaction being classified as potentially fraudulent based on the second risk score, the transaction processing system 106 and/or the merchant system 104 may cause fulfillment of a product or service associated with the payment transaction to be delayed and/or revoked (reversibly terminated with the potential of being reinstated upon further investigation) (a fraud risk mitigation action). The transaction processing system 106 and/or the merchant system 104 may initiate an investigation protocol to further investigate and determine whether the transaction is fraudulent. Should the investigation protocol determine that the payment transaction is fraudulent, the payment transaction may be canceled and not fulfilled. Should the investigation protocol determine that the payment transaction is non-fraudulent, the payment transaction may be fulfilled and the status of the payment transaction reclassified to non-fraudulent.

In some non-limiting embodiments or aspects, based the transaction being classified as potentially fraudulent based on the second risk score, the transaction processing system 106 and/or the merchant system 104 may cause the payment transaction to be canceled (a fraud risk mitigation action), such that the payment transaction is terminated. The payment transaction may be automatically canceled, which may occur without communicating a verification request to the user or initiating an investigation protocol.

Referring to FIGS. 2-7, FIG. 2 shows a method and system 200 for determining fraud using a second risk score, and FIGS. 3-7 show methods and systems 300-700 for determining fraud using a second risk score at different time steps during the process.

Figure 2:
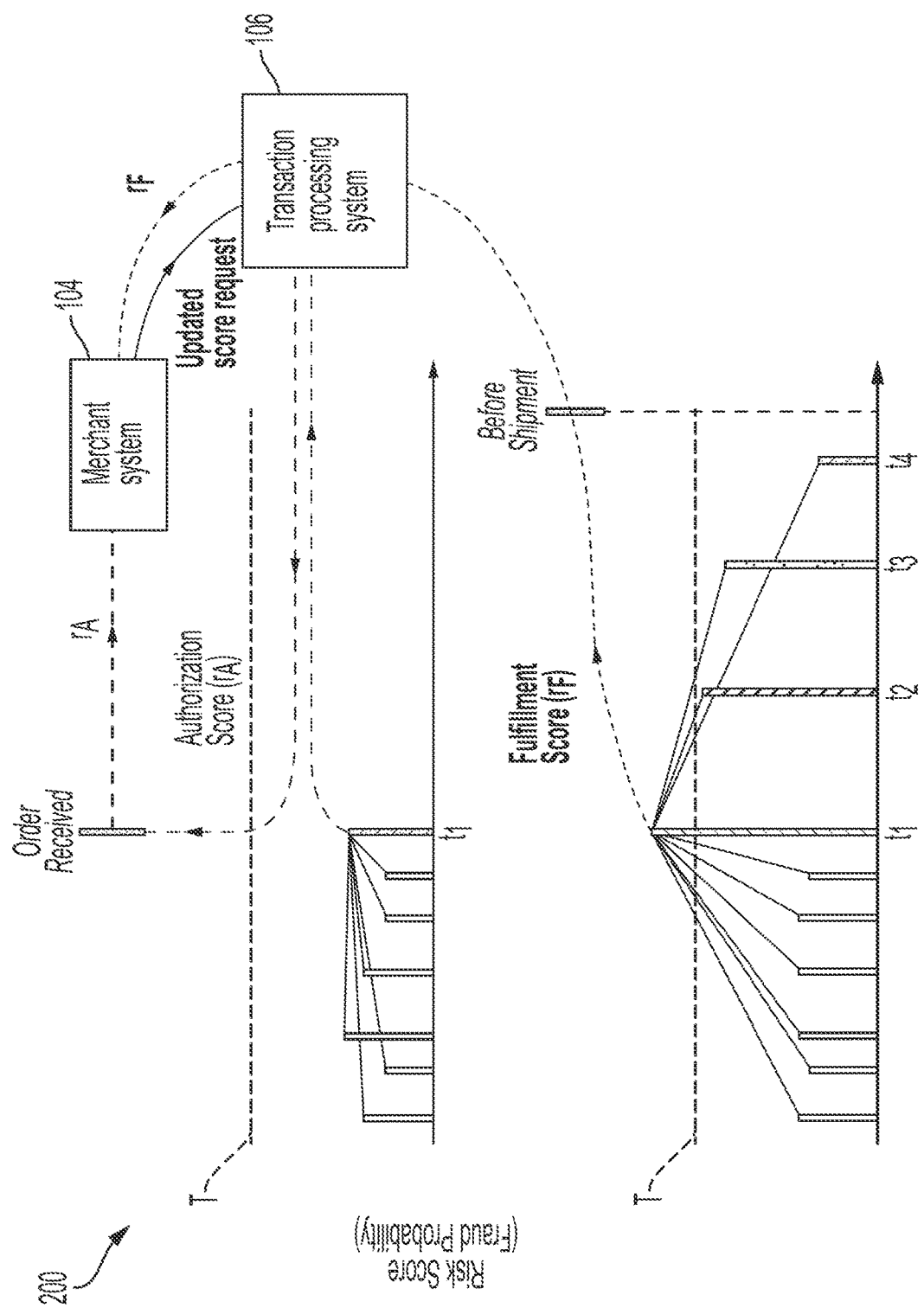
FIGS. 2-7 show schematic diagrams of methods and systems for determining fraud at different time steps, according to some non-limiting embodiments or aspects.

Referring to FIG. 2, the method and system 200 include the merchant system 104 and the transaction processing system 106 co-acting to determine fraud. The graphs in FIGS. 2-7 include a transaction timeline as the x-axis and a risk score as the y-axis. Electronic payment transactions are indicated individually as bars on the graph, where an electronic payment transaction occurs at the time identified along the x-axis and has a risk score of the magnitude indicated by the bar's height on the y-axis.

With continued reference to FIG. 2, the top graph includes a first transaction at $t_1$, and the first transaction is temporally preceded by a plurality of transactions, and $t_1$ corresponds to receipt of the ordered goods/services associated with the first transaction. The first transaction has a first risk score below a threshold T, which threshold T is the threshold of risk score at or above which indicates a potentially fraudulent transaction. A risk score below the threshold T is classified by the transaction processing system 106 and/or the merchant system 104 and/or the issuer system 114 (not shown) as a non-fraudulent transaction, and a risk score at or above the threshold T is classified by the transaction processing system 106 and/or the merchant system 104 and/or the issuer system 114 as a potentially fraudulent transaction.

With continued reference to FIG. 2, the top graph, in response to initiation of the first transaction, the merchant system 104 may generate and communicate the transaction request associated with the first transaction to the transaction processing system 106. In response to receiving the transaction request, the transaction processing system 106 may generate a first risk score for the first transaction, and the first risk score may be below the threshold T. The first risk score may be generated based at least in part on the first set of transaction data that includes transaction data associated with the plurality of transactions temporally preceding the first transaction. The transaction processing system 106 may generate and communicate a transaction approval request to the merchant system 104 based at least in part on the first risk score being below the threshold T (the issuer system 114 (not shown) may also have authorized/approved the first transaction).

With continued reference to FIG. 2, the bottom graph, a plurality of payment transactions may occur subsequent to the first transaction: a second transaction at $t_2$, a third transaction at $t_3$, and a fourth transaction at $t_4$. The bottom graph also shows a time before fulfillment of the goods/services associated with the first transaction, which occurs some time after $t_4$. The occurrence of the subsequent transactions (second-fourth transactions) may cause at least one second risk score to be generated for the first transaction. The second risk score may be generated by the transaction processing system 106 and based at least in part on the second set of transaction data received after the first risk score is determined. The transaction data received after the first risk score is determined includes transaction data corresponding to the second-fourth transactions. In this non-limiting example, based on considering the second set of transaction data (alternatively or in addition to the first set of transaction data), the second risk score for the first transaction increases to a value above the threshold T, such that the first transaction may be reclassified by the transaction processing system 106 and/or the merchant system 104 as a potentially fraudulent transaction. Since the second risk score is determined and communicated to the merchant system 104 before the fulfillment of the first transaction, the merchant system 104 and/or the transaction processing system 106 may initiate a fraud risk mitigation action to affect fulfillment thereof, such as generating the verification request, initiating the investigation protocol, delaying and/or revoking fulfillment, and/or automatically canceling the first transaction.

The transaction processing system 106 may generate the second risk score in response to receiving a risk score request from the merchant system 104 before fulfillment of the first transaction. The risk score request may be a mechanism by which the merchant system 104 ensures the transaction is non-fraudulent prior to fulfilling the transaction. The merchant system 104 may be enrolled in a program to enable the merchant system to receive at least one updated (second) risk score prior to fulfillment of transactions. Additionally or alternatively, the transaction processing system 106 may receive the risk score request from a processor thereof automatically in response to a subsequent transaction of the same user being initiated. Thus, the transaction processing system 106 may generate the second risk score automatically in response to the user initiating the second transaction. The transaction processing system 106 may communicate the second risk score(s) to the merchant system 104 in response to each subsequent transaction until fulfillment thereof. The transaction processing system 106 may communicate the second risk score(s) to the merchant system 104 in response to a subsequent transaction that causes the second risk score of the first transaction to satisfy the threshold T, such that the merchant system 104 is only notified of a second risk score and/or a change in classification of a transaction when the threshold T is satisfied.

FIGS. 3-7 show methods and systems 300-700 for determining fraud using a second risk score at different time steps during the process.

Figure 3:
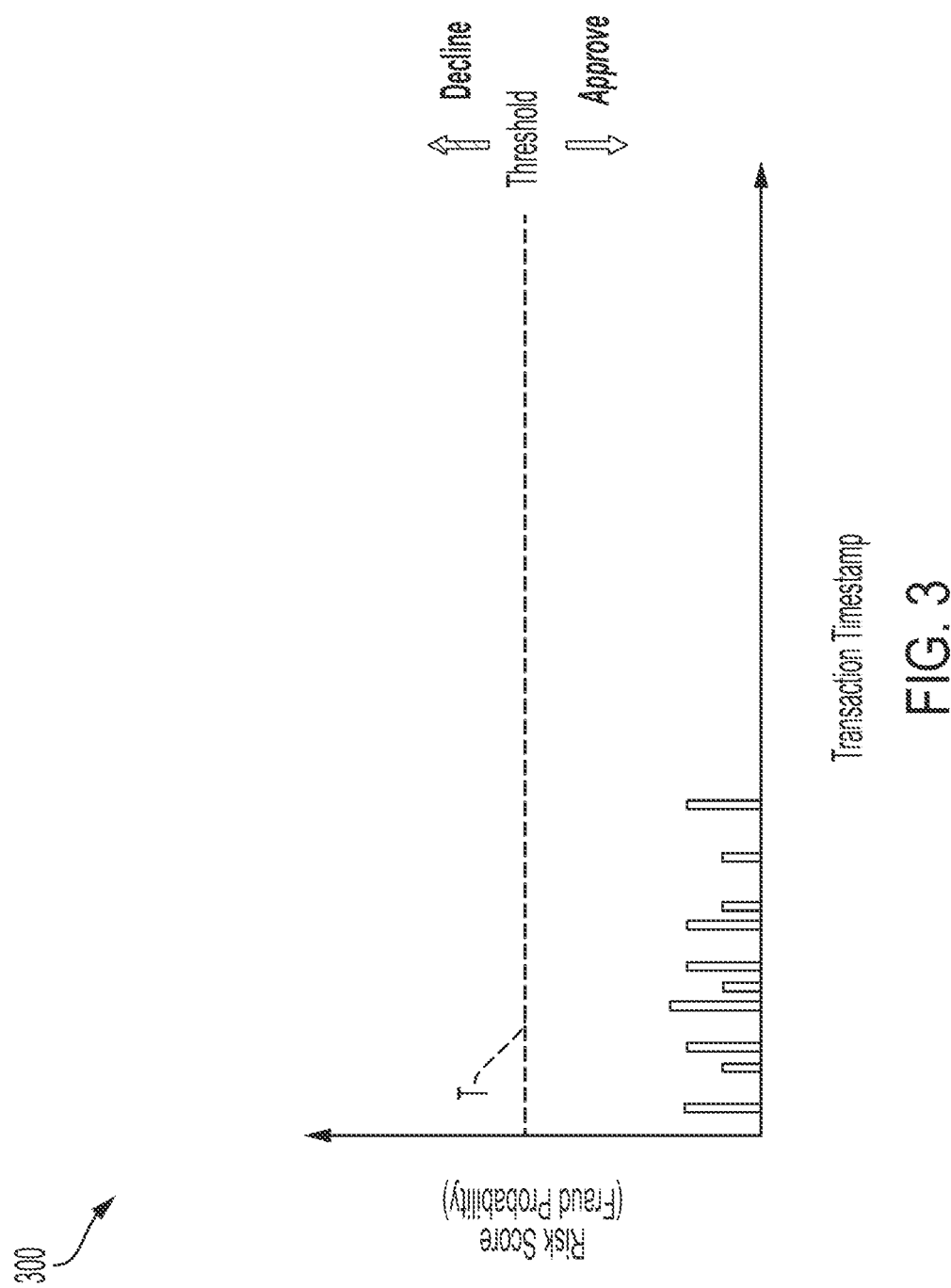

FIG. 3 shows the method and system 300 prior to the first transaction P1 (from FIGS. 4-7) being initiated. A plurality of transactions preceding the first transactions P1 have a risk score below the threshold T, as shown in the graph.

Figure 4:
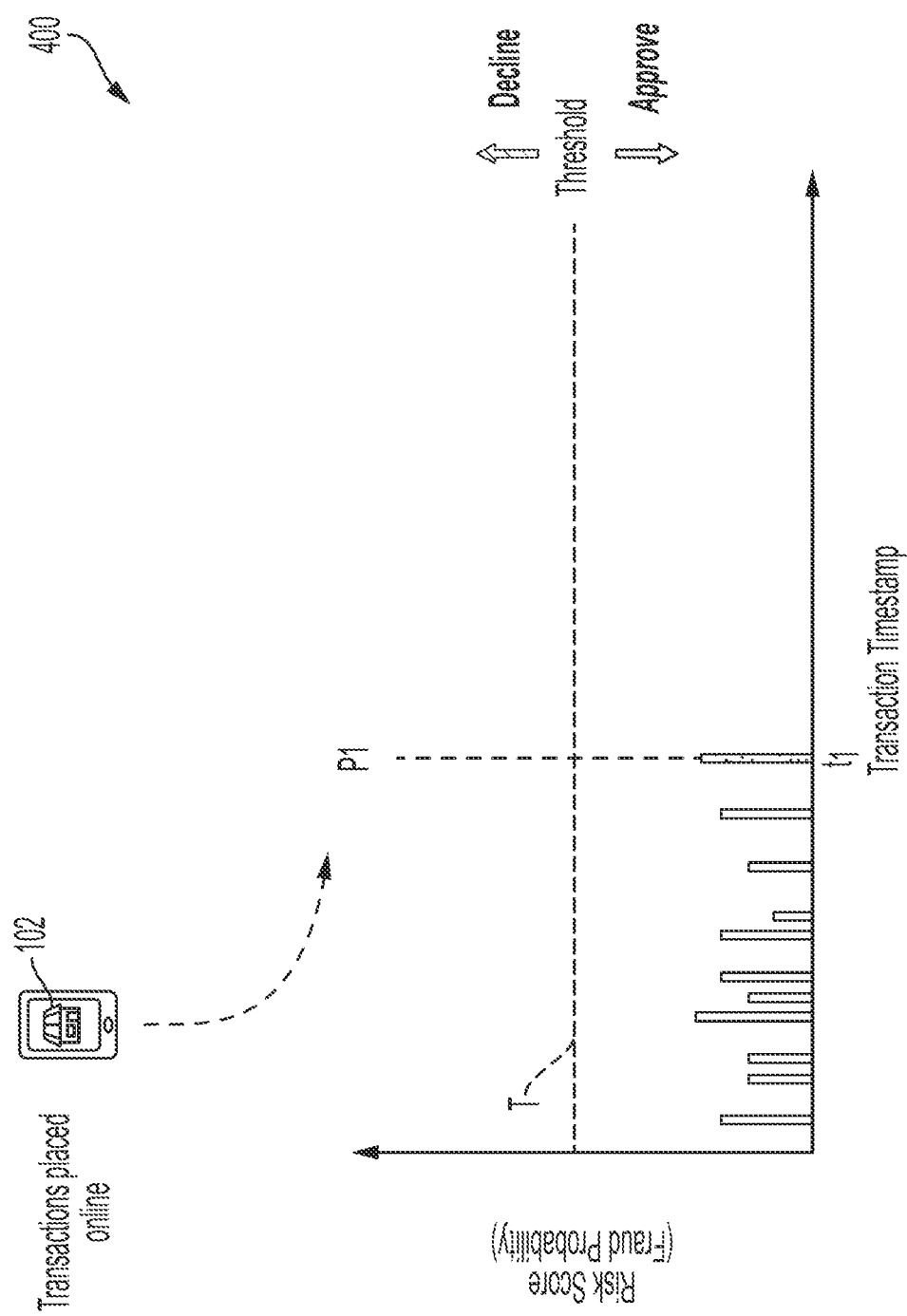

FIG. 4 shows the method and system 400 at the time of the first transaction P1 at $t_1$, which corresponds to the method and system 200 from FIG. 2, top graph. The first transaction P1 was initiated by a user using the user device 102. The first transaction P1 may have a first risk score determined by the transaction processing system 106 (not shown) to be below the threshold T, such that the first transaction P1 is initially approved.

Figure 5:
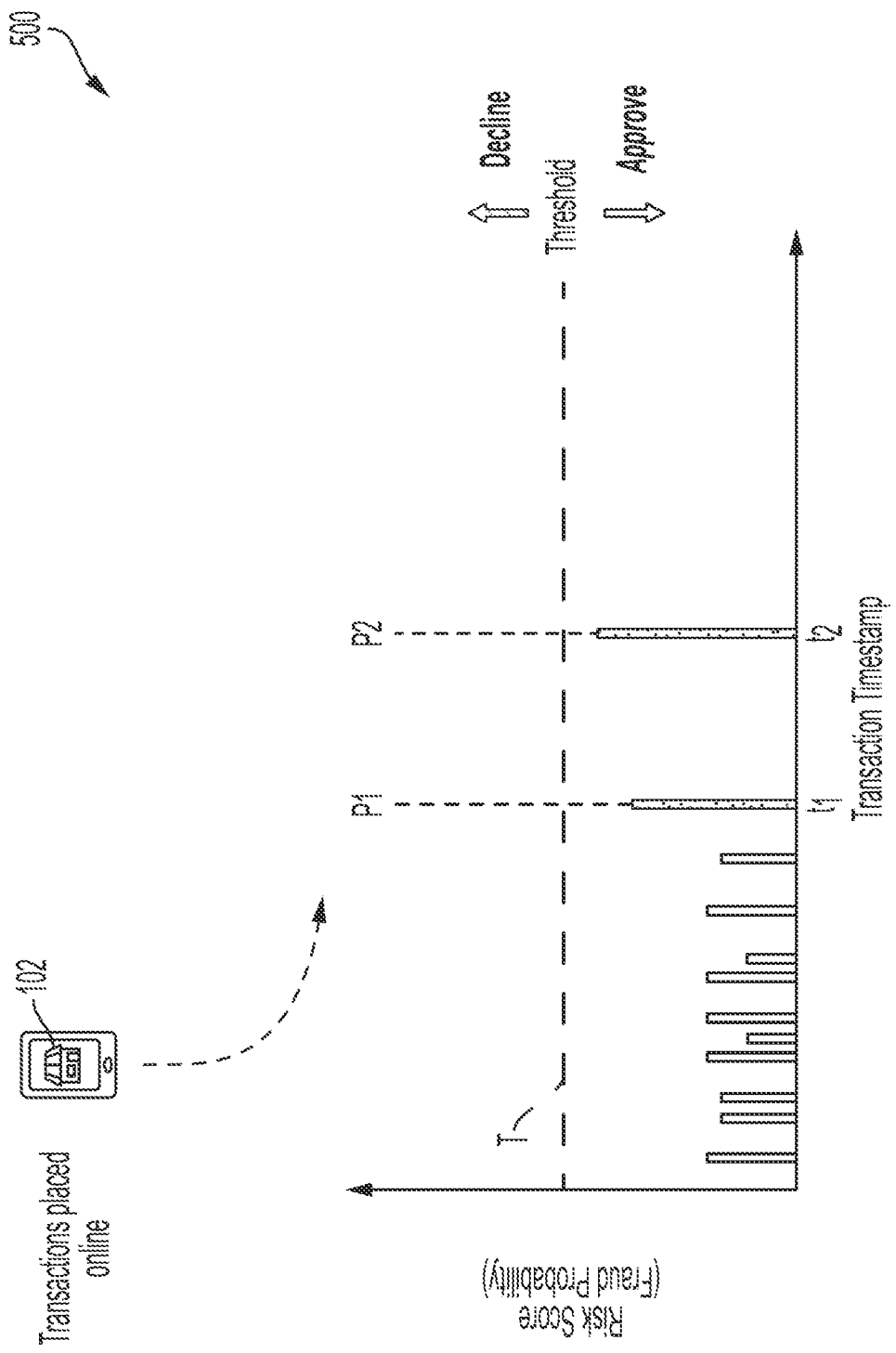

FIG. 5 shows the method and system 500 at the time of a second transaction P2 at $t_2$. A second risk score for the first transaction P1 may be generated by the transaction processing system 106 (not shown), and the second risk score may be generated based on the second transaction data associated with the second transaction P2 being included in the second set of transaction data. The second risk score for the first transaction P1 may be higher than the first risk score for the first transaction P1 at time $t_1$ based on the inclusion of the second set of transaction data in the algorithm. However, the second risk score for the first transaction may still be below the threshold T, such that the transaction remains classified as non-fraudulent. Further, the first risk score for the second transaction P2 may be generated at time $t_2$, and the first risk score for the second transaction P2 may be below the threshold T such that the second transaction P2 is also initially approved.

Figure 6:
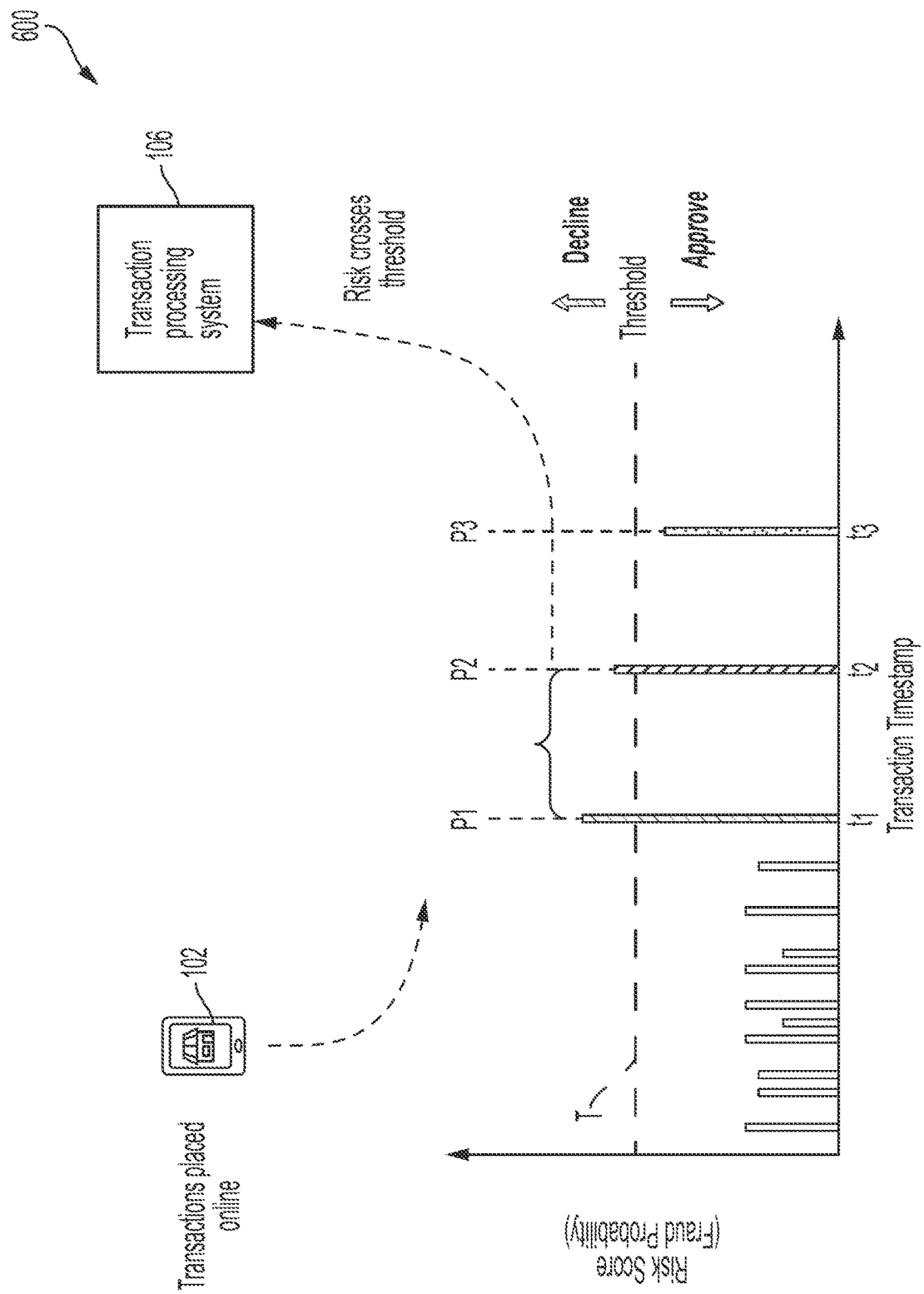

FIG. 6 shows the method and system 600 at the time of a third transaction P3 at $t_3$. Another second risk score for the first transaction P1 may be generated by the transaction processing system 106, and the second risk score may be generated based on the third transaction data associated with the third transaction P3 also being included in the second set of transaction data. A second risk score for the second transaction P2 may be generated by the transaction processing system 106, and the second risk score may be generated based on the third transaction data associated with the third transaction P3 being included in the second set of transaction data. The second risk score at time $t_3$ for the first transaction P1 and second transaction P2 may be higher than the first risk score for the first transaction P1 and second transaction P2 based on the inclusion of the second set of transaction data in the algorithm. In this non-limiting example, the second risk score for the first transaction P1 and the second transaction P2 now satisfy threshold T such that the transaction is automatically re-classified as potentially fraudulent by the transaction processing system 106 and/or the merchant system 104 and/or the issuer system 114 (not shown). The transaction processing system 106 may identify the first transaction P1 and the second transaction P2 as potentially fraudulent transactions.

With continued reference to FIG. 6, the first risk score for the third transaction P3 may be generated at time $t_3$, and the first risk score for the third transaction P3 may be below the threshold T such that the third transaction P3 is initially approved.

Figure 7:
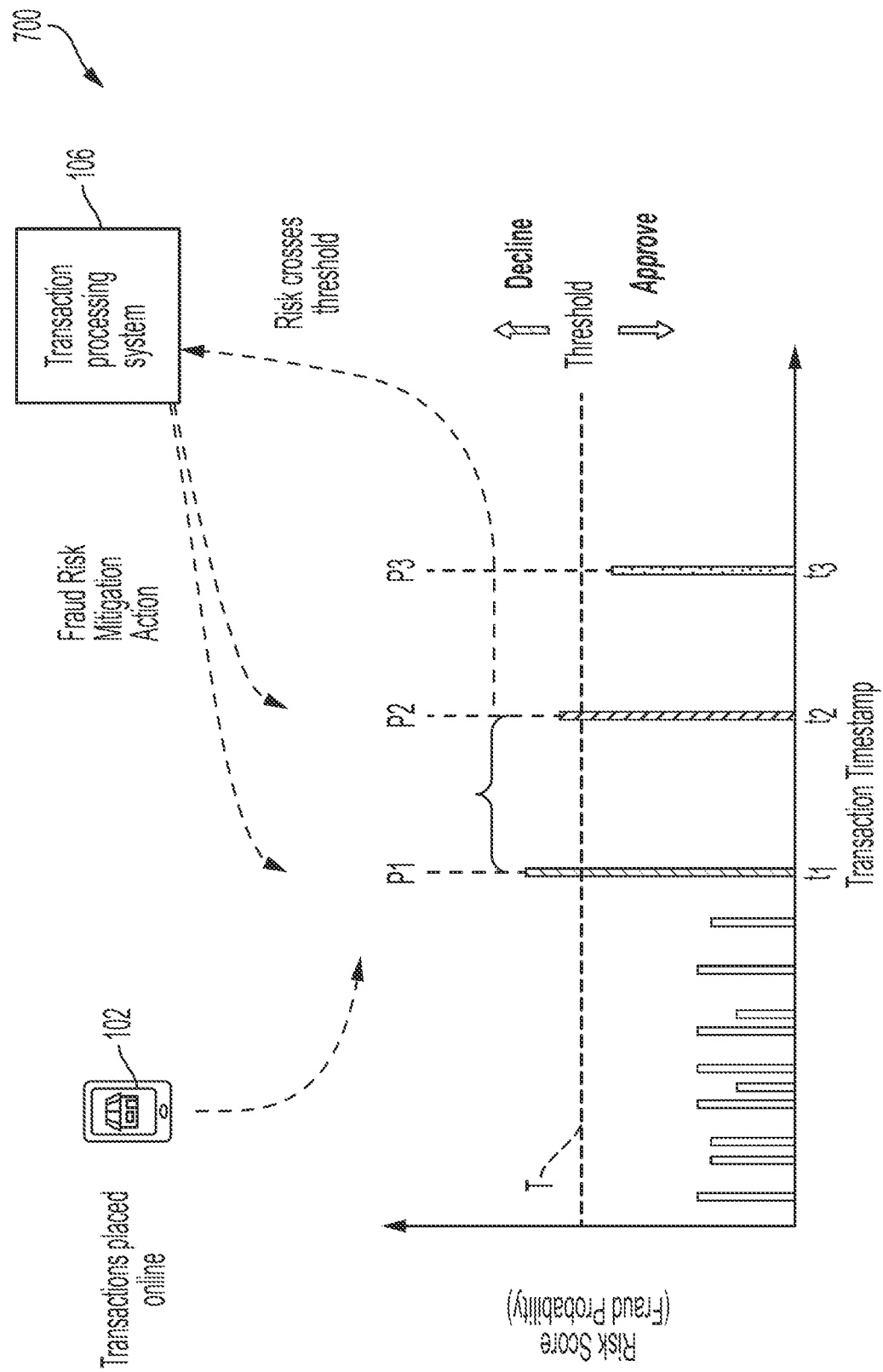

FIG. 7 shows the method and system 700 at some time during or after the third transaction P3 at $t_3$. In response to the transaction processing system 106 identifying the first transaction P1 and the second transaction P2 as potentially fraudulent transactions, the transaction processing system 106 may cause a fraud risk mitigation action to be initiated for those transactions, as previously described.

Figure 10:
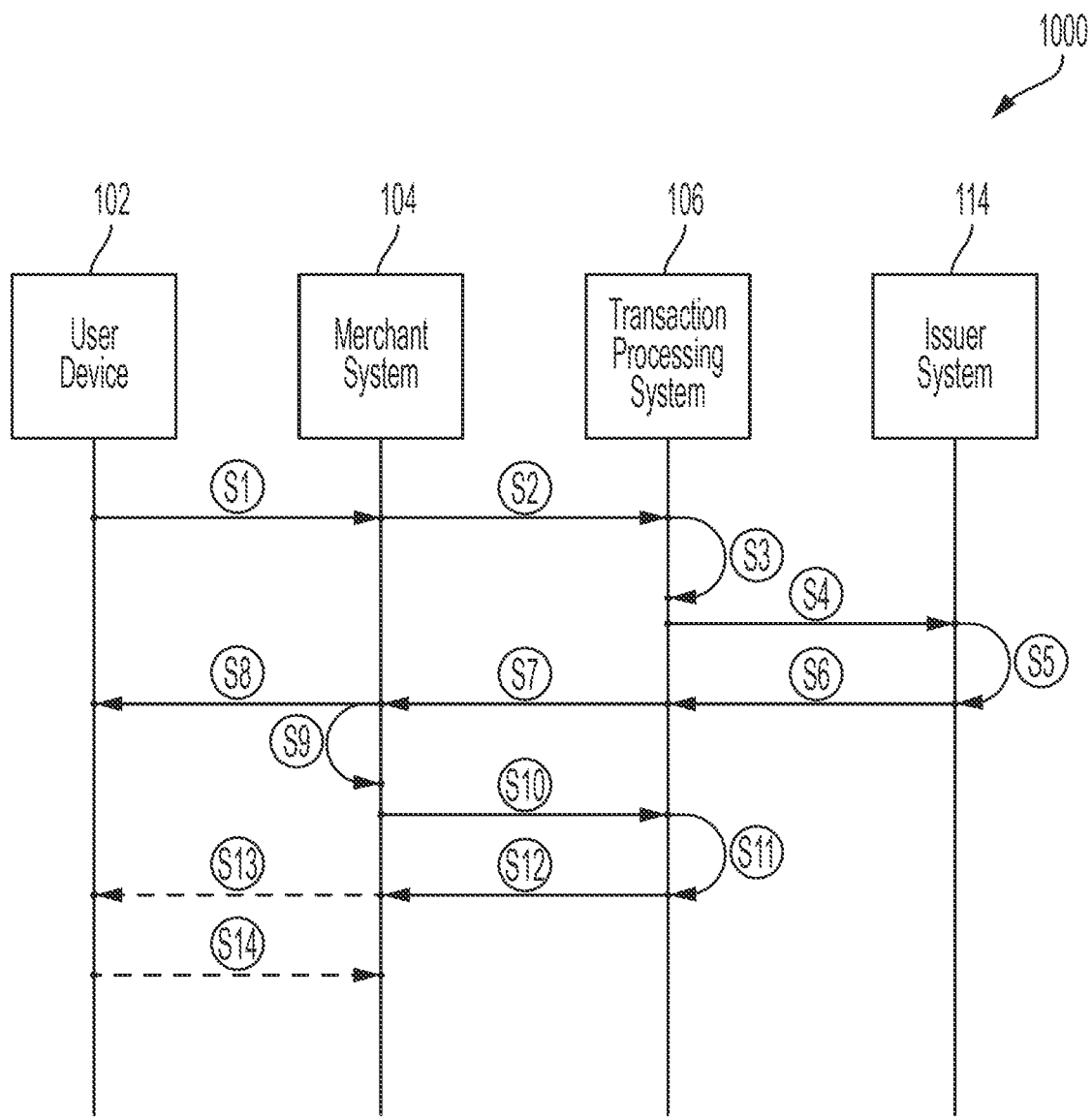
FIG. 10 shows a process flow diagram of a method and system for determining fraud, according to some non-limiting embodiments or aspects.

Referring to FIG. 10, a method and system 1000 is shown for determining fraud, according to some non-limiting embodiments or aspects. At a step S1, the user may initiate an electronic payment transaction with the merchant system 104 of a merchant for goods and/or services using the user device 102. At a step S2, in response to the electronic payment transaction being initiated, the merchant system 104 may generate a transaction request for the electronic payment transaction and may communicate the transaction request to the transaction processing system 106. The transaction request may comprise data fields containing transaction data to be used to authorize, clear, settle, and/or fulfill the electronic payment transaction.

With continued reference to FIG. 10, at a step S3, in response to receiving the transaction request, the transaction processing system 106 may generate a first risk score associated with the electronic payment transaction, which may indicate a likelihood that the electronic payment transaction is fraudulent. The first risk score may be generated based on the first set of transaction data associated with payment transactions received (e.g., in the transaction database 112 (from FIG. 1)) and/or processed (e.g., by the transaction processing system 106) prior to receipt of the transaction request. The first risk score may be below a threshold indicating that the electronic payment transaction is not fraudulent, such that processing of the electronic payment transaction may continue. At a step S4, the transaction processing system may generate and communicate an authorization request to the issuer system 114. The authorization request may comprise fields containing transaction data to be used to authorize the electronic payment transaction, such as fields specified in ISO 8583. The authorization request may comprise a field containing the first risk score.

At a step S5, in response to receiving the authorization request, the issuer system 114 may generate an authorization decision for the electronic payment transaction. In this non-limiting example, the issuer system 114 may generate an authorization decision to authorize/approve the electronic payment transaction. The authorization decision may be based on the transaction data contained in the authorization request, including the first risk score. At a step S6, the issuer system 114 may generate and communicate an authorization response to the transaction processing system 106. The authorization response may comprise a data field containing an indicator corresponding to the authorization decision.

At a step S7, the transaction processing system 106 may generate and communicate a transaction response to the merchant system 104. The transaction response may comprise a field containing the authorization decision to approve the electronic payment transaction.

At a step S8, the merchant system 104 may generate and communicate a message to the user device 102, and the message may comprise a field containing the authorization decision, to notify the user device 102 that the electronic payment transaction has been initially authorized/approved. Further, at a step S9, in response to receiving the transaction response containing the authorized/approved authorization decision, the merchant system 104 may further process the electronic payment transaction. Further processing may include the merchant system 104 preparing the electronic payment transaction for fulfillment. Further processing may include the merchant system 104 initiating clearing and/or settling of the electronic payment transaction.

With continued reference to FIG. 10, at a step S10, after the transaction request has been approved and/or prior to fulfillment of the electronic payment transaction, the merchant system 104 may generate and communicate a risk score request for the electronic payment transaction to the transaction processing system 106. During the time period after approval and/or during the time period the merchant system 104 was preparing the electronic payment transaction for fulfillment, at least one subsequent electronic payment transaction (subsequent the electronic payment transaction) may have been initiated by the same user and/or merchant.

In response to receiving the risk score request, at a step S11, the transaction processing system 106 may generate a second risk score associated with the electronic payment transaction, which may indicate an updated likelihood that the electronic payment transaction is fraudulent. The second risk score may be generated based on the second set of transaction data, which may include transaction data received after the first risk score is determined (e.g., transaction data associated with the at least one subsequent electronic payment transaction of the user and/or merchant processed after initiation of the electronic payment transaction). The second risk score may also be based on the first set of transaction data. The second risk score may be above a threshold indicating that the electronic payment transaction is potentially fraudulent, such that the electronic payment transaction may be automatically reclassified as potentially fraudulent. At a step S12, the transaction processing system 106 may generate and communicate a risk score response to the merchant system 104. The risk score response may comprise a field containing the second risk score and/or an indicator corresponding to the updated classification of the electronic payment transaction (as potentially fraudulent).

With continued reference to FIG. 10, in response to receiving the risk score response, the merchant system 104 (and/or the transaction processing system 106), may initiate a fraud risk mitigation action for the electronic payment transaction.

For example, at a step S13, the merchant system 104 may cancel the electronic payment transaction and communicate a message notifying the user device 102 of the cancellation.

For example, at a step S13, the merchant system 104 may cause fulfillment of the electronic payment transaction to be delayed and/or revoked and communicate a message notifying the user device 102 of the delay/revocation. The merchant system 104 may initiate the investigation protocol.

For example, at a step S13, the merchant system 104 may generate and communicate a verification request to the user device 102. At a step S14, in response to receiving the verification request, the user device 102 may generate and communicate a verification response to the merchant system 104. The verification response may comprise a field containing an indicator corresponding to whether the user identifies the electronic payment transaction as fraudulent. The indicator may indicate that the electronic payment transaction is fraudulent or is not fraudulent. In response to the indicator indicating that the electronic payment transaction is fraudulent, the electronic payment transaction may be canceled (e.g., by the merchant system 104, the transaction processing system 106, the issuer system 114, and the like). In response to the indicator indicating that the electronic payment transaction is not fraudulent, processing of the electronic payment transaction may continue, including fulfillment, clearing, and/or settlement of the electronic payment transaction (e.g., by the merchant system 104, the transaction processing system 106, the issuer system 114, and the like).

Figure 11:
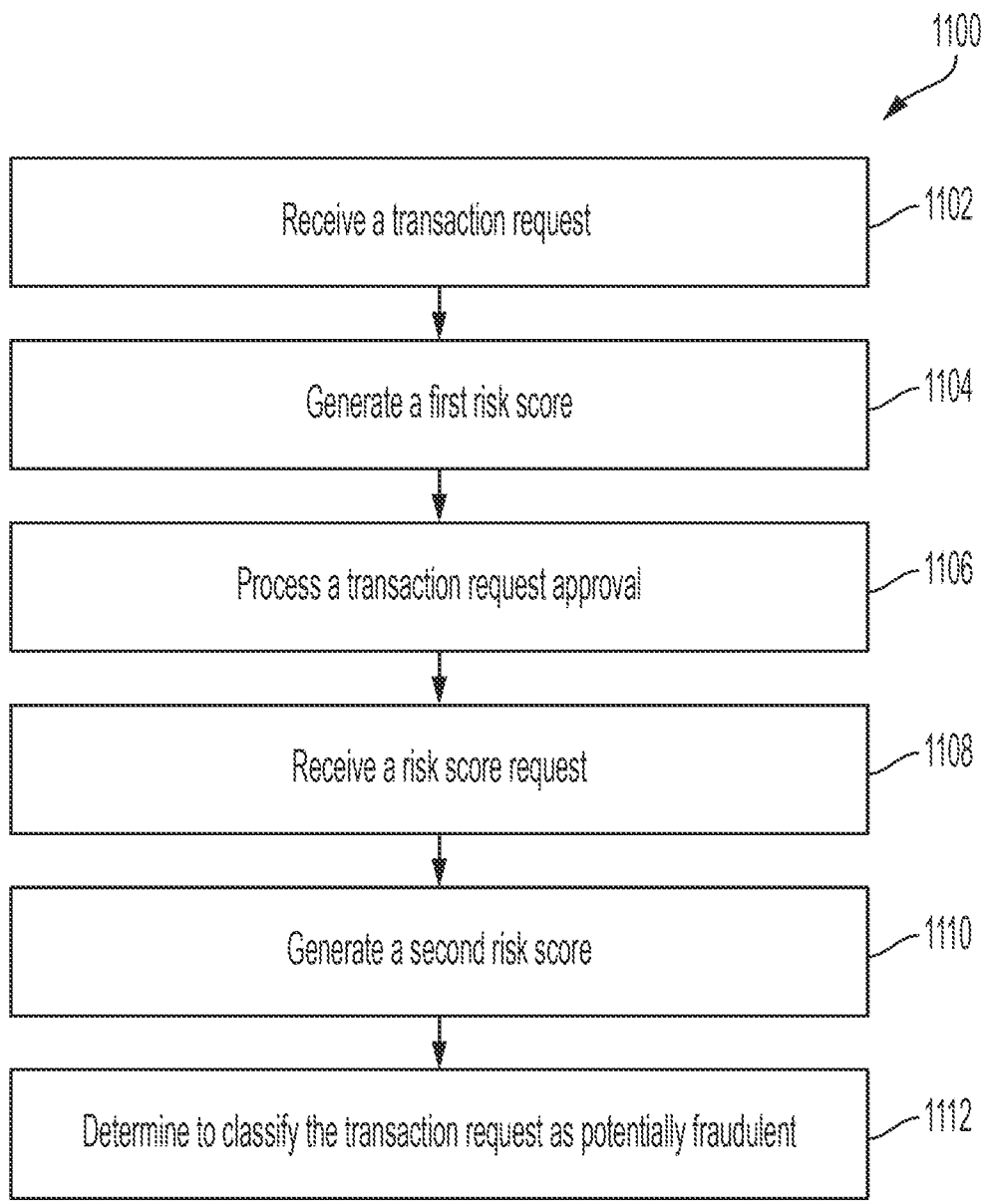
FIG. 11 shows a step diagram of a method for determining fraud, according to some non-limiting embodiments or aspects.

Referring to FIG. 11, a method 1100 is shown for determining fraud, according to some non-limiting embodiments or aspects. At a step 1102, the method 1100 may include the transaction processing system receiving a transaction request from the merchant system, the transaction request associated with a first payment transaction between a merchant and a user. At a step 1104, the transaction processing system may generate a first risk score in response to the transaction request and a first set of transaction data received prior to the transaction request. At a step 1106, the transaction processing system may process a transaction request approval in response to the first risk score not satisfying a first threshold. At a step 1108, the transaction processing system may receive a risk score request from the merchant system or a separate merchant system, the risk score request associated with the first payment transaction. The risk score request may be received after the transaction request has been approved. At a step 1110, the transaction processing system may generate a second risk score based on a second set of transaction data received after the first risk score is determined. At a step 1112, the transaction processing system may automatically classify the transaction as potentially fraudulent in response to determining that the second risk score satisfies a second threshold.

In some non-limiting embodiment or aspects, a computer program product for determining fraud includes at least one non-transitory computer readable medium including program instructions that, when executed by at least one processor, cause the at least one processor to execute one of the previously-described methods. The at least one processor may include any of the components shown in FIGS. 1-11 (e.g., the user device 102, the merchant system 104, the transaction processing system 106, the transaction processor 108, the risk processor 110, the issuer system 114, and the like).

Figure 12:
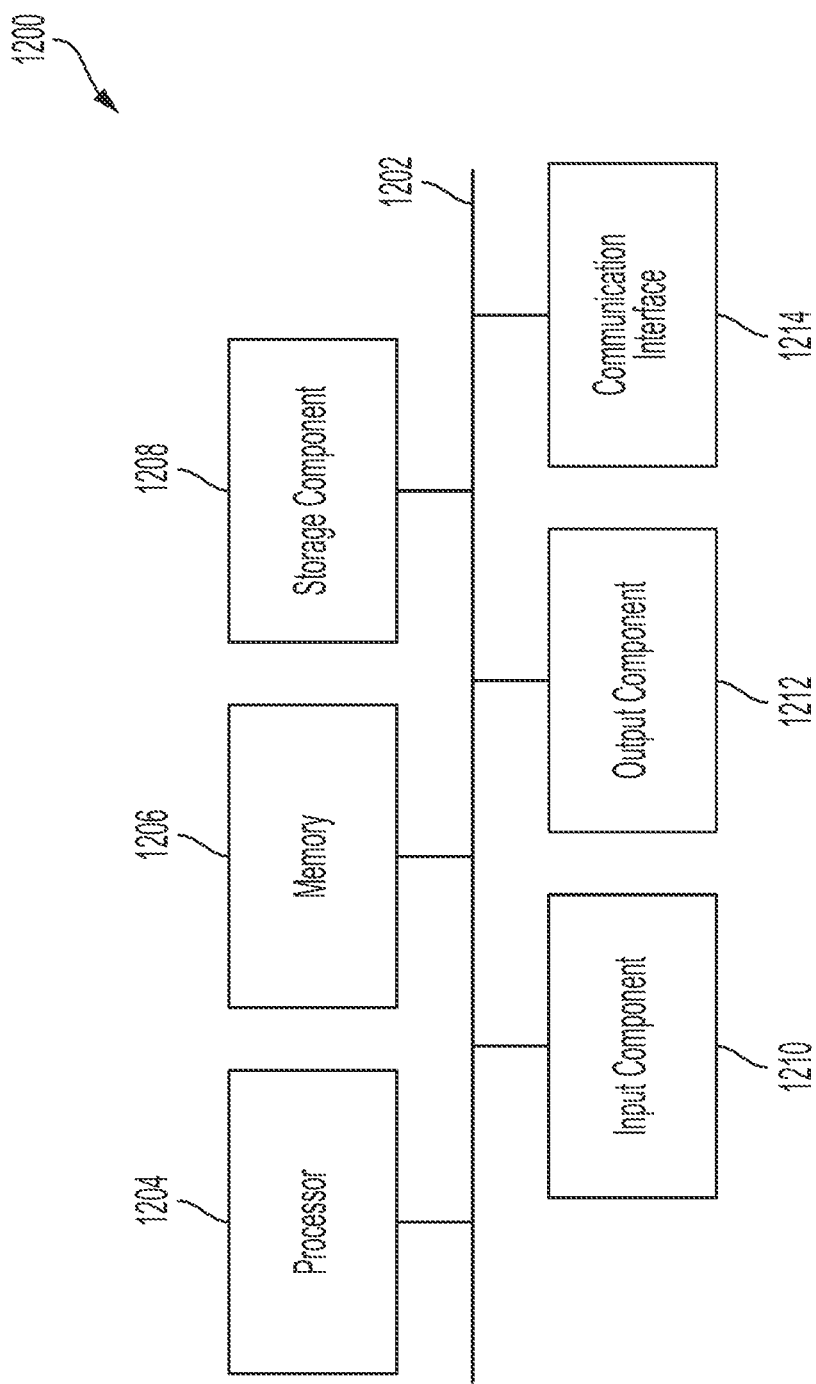
FIG. 12 shows a diagram of components of one or more devices and/or one or more systems of FIGS. 1-11, according to some non-limiting embodiments or aspects.

Referring to FIG. 12, a diagram is shown of example components of device 1200. Device 1200 may correspond to one or more devices or systems described herein, such as the user device 102, the merchant system 104, the transaction processing system 106, the transaction processor 108, the risk processor 110, the transaction database 112, and/or the issuer system 114. In some non-limiting embodiments, one or more devices or systems described herein may include at least one device 1200 and/or at least one component of device 1200. As shown in FIG. 12, device 1200 may include bus 1202, processor 1204, memory 1206, storage component 1208, input component 1210, output component 1212, and communication interface 1214.

Bus 1202 may include a component that permits communication among the components of device 1200. In some non-limiting embodiments, processor 1204 may be implemented in hardware, software, or a combination of hardware and software. For example, processor 1204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 1206 may include random access memory (RAM), read-only memory (ROM), and/or another type of dynamic or static storage device (e.g., flash memory, magnetic memory, optical memory, etc.) that stores information and/or instructions for use by processor 1204.

Storage component 1208 may store information and/or software related to the operation and use of device 1200. For example, storage component 1208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 1210 may include a component that permits device 1200 to receive information, such as via user input (e.g., a touchscreen display, a keyboard, a keypad, a mouse, a button, a switch, a microphone, a camera, etc.). Additionally or alternatively, input component 1210 may include a sensor for sensing information (e.g., a global positioning system (GPS) component, an accelerometer, a gyroscope, an actuator, etc.). Output component 1212 may include a component that provides output information from device 1200 (e.g., a display, a speaker, one or more light-emitting diodes (LEDs), etc.).

Communication interface 1214 may include a transceiver-like component (e.g., a transceiver, a separate receiver and transmitter, etc.) that enables device 1200 to communicate with other devices, such as via a wired connection, a wireless connection, or a combination of wired and wireless connections. Communication interface 1214 may permit device 1200 to receive information from another device and/or provide information to another device. For example, communication interface 1214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 1200 may perform one or more processes described herein. Device 1200 may perform these processes based on processor 1204 executing software instructions stored by a computer-readable medium, such as memory 1206 and/or storage component 1208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 1206 and/or storage component 1208 from another computer-readable medium or from another device via communication interface 1214. When executed, software instructions stored in memory 1206 and/or storage component 1208 may cause processor 1204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

Memory 1206 and/or storage component 1208 may include data storage or one or more data structures (e.g., a database, and/or the like). Device 1200 may be capable of receiving information from, storing information in, communicating information to, or searching information stored in the data storage or one or more data structures in memory 1206 and/or storage component 1208. For example, the information may include input data, output data, transaction data, account data, or any combination thereof.

EXAMPLES

A simulation was conducted to determine the effectiveness of determining fraud according to some non-limiting embodiments or aspects. The simulation targeted card-not-present transactions having a large purchase order lead time ranging from few hours to a few days. The simulation demonstrated the efficacy of the proposed scheme by reporting performance improvement. The performance was evaluated from the area under the curve (AUC) values (curves shown in FIG. 9) using the average Dollar Catch Rate ($ CR) over the false positive ratio (FPR) range of approximately 10-20.

Figure 8:
FIG. 8 shows a table including performance data for a simulation run according to some non-limiting embodiments or aspects.

Referring to FIG. 8, a table 800 shows performance for fraud determination using transaction data of 8 different merchants compared across 3 different models: an existing model (VAA), a uni-directional model (v1), and a bi-directional model (v2) with a future time-window of 48 hours. The models were trained using a transaction data set from September 2017 to September 2018. The merchants were major online retailers, and the simulation was run using historical transaction data from October-December 2018. The numbers in parenthesis specify the improvement over the existing model (e.g., the uni-directional and bi-directional models showed 5.4 and 10.5 fold improvement, respectively, over the VAA model for Merchant 1). Given the time scale of the simulation, reliable existing model (VAA) scores for certain merchants could not be obtained, corresponding to the values in the table 800 denoted by "NA".

Figure 9:
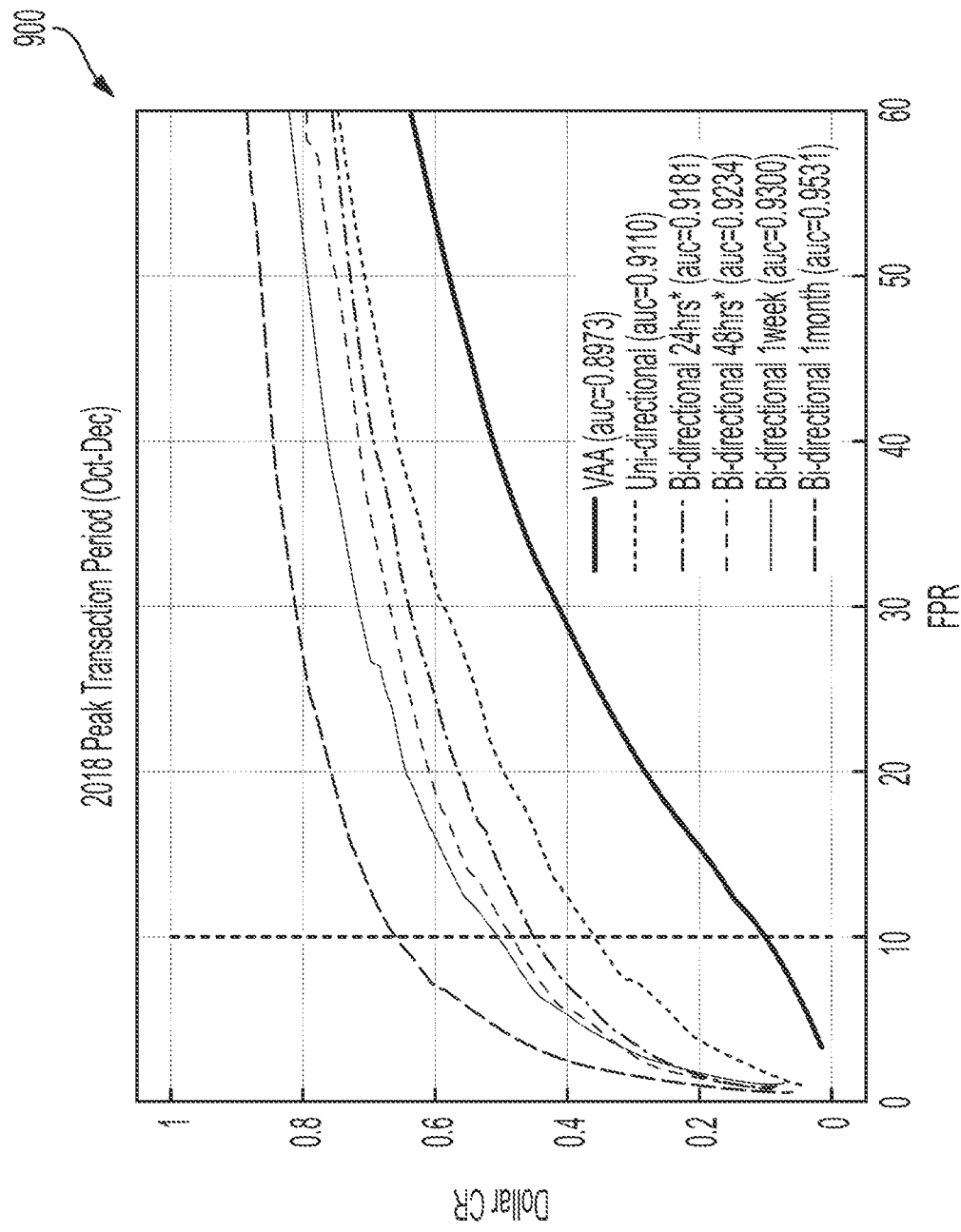
FIG. 9 shows a graph including performance data for a simulation run according to some non-limiting embodiments or aspects.

To facilitate a more comprehensive comparison across different models, the simulation also considered the online retailers that reported a high number of fraudulent transactions during July-December 2018. FIG. 9 shows plots 900 of the $ CR at different values of FPR for VAA, uni-directional, and bi-directional models.

From the AUC scores, it was clear that the bi-directional models (AUC=0.9181 for 24 hours, 0.9234 for 48 hours, 0.9300 for 1 week, and 0.9531 for 1 month) were a significant improvement over the existing (AUC=0.8973) and uni-directional (AUC=0.9110) models. Further, the improvement in the $ CR at low-FPR (<60) was a relevant outcome since it corresponds to the parameters at which issuer banks are likely to operate. At FPR=10, the bi-directional model with future time-window=48 hours had a $ CR=0.46, which was approximately a 470% improvement over the existing model ($ CR=0.08) and an approximately 40% improvement over the uni-directional ($ CR=0.33) model.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment, and one or more steps may be taken in a different order than presented in the present disclosure.

What is claimed is:

1. A method of determining fraud, comprising:
   receiving, from a merchant system and with at least one processor, a transaction request associated with a first payment transaction between a merchant and a user, the first payment transaction having a time period between transaction initiation and transaction fulfillment;
   at a first time during the time period, generating, with a machine-learning model of the at least one processor, a first risk score by inputting transaction data of the transaction request and a first set of historical transaction data associated with payment transactions of the user received and processed prior to the transaction request into the machine-learning model, the machine-learning model comprising a plurality of recurrent neural network layers comprising a forward recurrent neural network layer in which data flows in a positive direction and a backwards neural network layer in which data flows in a negative direction, the first risk score not satisfying a first threshold;
   processing a transaction request approval, with the at least one processor, based on the first risk score not satisfying the first threshold;
   at a second time during the time period and after the first time, receiving, with the at least one processor and from the merchant system or a separate merchant system, a risk score request associated with the first payment transaction, wherein the risk score request is received after the transaction request has been approved and prior to the transaction fulfillment of the first payment transaction;
   generating, with the machine-learning model of the at least one processor, a second risk score by inputting a second set of transaction data received after the first risk score is determined into the machine-learning model, the second set of transaction data comprising transaction data associated with at least one payment transaction initiated after the first payment transaction is initiated, the second risk score satisfying a second threshold;
   automatically classifying, with the at least one processor, the first payment transaction as potentially fraudulent in response to determining that the second risk score satisfies the second threshold; and
   in response to classifying the first payment transaction as potentially fraudulent, at least one of: automatically causing the first payment transaction to be cancelled, automatically causing fulfillment of a product or service associated with the first payment transaction to be delayed or revoked, or automatically communicating a verification request to a device associated with the user to cause the user to indicate whether the first payment transaction is fraudulent.

2. The method of claim 1, wherein the second risk score is generated based on inputting the first set of transaction data and the second set of transaction data into the machine-learning model.

3. The method of claim 1, wherein the bi-directional recurrent neural network comprises long short-term memory or gated recurrent unit cells.

4. The method of claim 1, wherein the first set of transaction data comprises transaction data associated with transactions of the user processed prior to initiation of the first payment transaction.

5. The method of claim 1, wherein the second set of transaction data comprises transaction data associated with transactions of the user processed after initiation of the first payment transaction.

6. The method of claim 1, comprising:
   in response to classifying the first payment transaction as potentially fraudulent, automatically causing the first payment transaction to be cancelled.

7. The method of claim 1, comprising:
   in response to classifying the first payment transaction as potentially fraudulent, automatically causing fulfillment of the product or service associated with the first payment transaction to be delayed or revoked.

8. The method of claim 1, comprising:
   in response to classifying the first payment transaction as potentially fraudulent, automatically communicating the verification request to the device associated with the user to cause the user to indicate whether the first payment transaction is fraudulent.

9. The method of claim 1, wherein the first payment transaction comprises a card-not-present e-commerce payment transaction.

10. The method of claim 1, wherein the time period between transaction initiation and transaction fulfillment is at least one hour.

11. The method of claim 1, further comprising:
    modifying, with the at least one processor, the machine-learning model based at least partially on the first payment transaction.

12. A system for determining fraud, comprising at least one processor programmed or configured to:
    receive, from a merchant system, a transaction request associated with a first payment transaction between a merchant and a user, the first payment transaction having a time period between transaction initiation and transaction fulfillment;
    at a first time during the time period, generate, with a machine-learning model, a first risk score by inputting transaction data of the transaction request and a first set of historical transaction data associated with payment transactions of the user received and processed prior to the transaction request into the machine-learning model, the machine-learning model comprising a plurality of recurrent neural network layers comprising a forward recurrent neural network layer in which data flows in a positive direction and a backwards neural network layer in which data flows in a negative direction, the first risk score not satisfying a first threshold;
    process a transaction request approval based on the first risk score not satisfying the first threshold;

at a second time during the time period and after the first time, receive, from the merchant system or a separate merchant system, a risk score request associated with the first payment transaction, wherein the risk score request is received after the transaction request has been approved and prior to the transaction fulfillment of the first payment transaction;

generate, with the machine-learning model, a second risk score by inputting a second set of transaction data received after the first risk score is determined into the machine-learning model, the second set of transaction data comprising transaction data associated with at least one payment transaction initiated after the first payment transaction is initiated, the second risk score satisfying a second threshold;

automatically classify the first payment transaction as potentially fraudulent in response to determining that the second risk score satisfies the second threshold; and in response to classifying the first payment transaction as potentially fraudulent, at least one of: automatically cause the first payment transaction to be cancelled, automatically cause fulfillment of a product or service associated with the first payment transaction to be delayed or revoked, or automatically communicate a verification request to a device associated with the user to cause the user to indicate whether the first payment transaction is fraudulent.

13. The system of claim 12, wherein the second risk score is generated based on inputting the first set of transaction data and the second set of transaction data into the machine-learning model.

14. The system of claim 12, wherein the bi-directional recurrent neural network comprises long short-term memory or gated recurrent unit cells.

15. The system of claim 12, wherein the first set of transaction data comprises transaction data associated with transactions of the user processed prior to initiation of the first payment transaction.

16. The system of claim 12, wherein the second set of transaction data comprises transaction data associated with transactions of the user processed after initiation of the first payment transaction.

17. The system of claim 12, wherein the at least one processor is programmed or configured to:
in response to classifying the first payment transaction as potentially fraudulent, automatically cause the first payment transaction to be cancelled.

18. The system of claim 12, wherein the at least one processor is programmed or configured to:
in response to classifying the first payment transaction as potentially fraudulent, automatically cause fulfillment of the product or service associated with the first payment transaction to be delayed or revoked.

19. The system of claim 12, wherein the at least one processor is programmed or configured to:
in response to classifying the first payment transaction as potentially fraudulent, automatically communicate the verification request to the device associated with the user to cause the user to indicate whether the first payment transaction is fraudulent.

20. A computer program product for determining fraud comprising at least one non-transitory computer-readable medium including program instructions that, when executed by at least one processor, cause the at least one processor to:
receive, from a merchant system, a transaction request associated with a first payment transaction between a merchant and a user, the first payment transaction having a time period between transaction initiation and transaction fulfillment;

at a first time during the time period, generate, with a machine-learning model, a first risk score by inputting transaction data of the transaction request and a first set of historical transaction data associated with payment transactions of the user received and processed prior to the transaction request into the machine-learning model, the machine-learning model comprising a plurality of recurrent neural network layers comprising a forward recurrent neural network layer in which data flows in a positive direction and a backwards neural network layer in which data flows in a negative direction, the first risk score not satisfying a first threshold;

process a transaction request approval based on the first risk score not satisfying the first threshold;

at a second time during the time period and after the first time, receive, from the merchant system or a separate merchant system, a risk score request associated with the first payment transaction, wherein the risk score request is received after the transaction request has been approved and prior to the transaction fulfillment of the first payment transaction;

generate, with the machine-learning model, a second risk score by inputting a second set of transaction data received after the first risk score is determined into the machine-learning model, the second set of transaction data comprising transaction data associated with at least one payment transaction initiated after the first payment transaction is initiated, the second risk score satisfying a second threshold;

automatically classify the first payment transaction as potentially fraudulent in response to determining that the second risk score satisfies the second threshold; and in response to classifying the first payment transaction as potentially fraudulent, at least one of: automatically cause the first payment transaction to be cancelled, automatically cause fulfillment of a product or service associated with the first payment transaction to be delayed or revoked, or automatically communicate a verification request to a device associated with the user to cause the user to indicate whether the first payment transaction is fraudulent.

21. The computer program product of claim 20, wherein the second risk score is generated based on inputting the first set of transaction data and the second set of transaction data into the machine-learning model.

22. The computer program product of claim 20, wherein the bi-directional recurrent neural network comprises long short-term memory or gated recurrent unit cells.

23. The computer program product of claim 20, wherein the first set of transaction data comprises transaction data associated with transactions of the user processed prior to initiation of the first payment transaction.

24. The computer program product of claim 20, wherein the second set of transaction data comprises transaction data associated with transactions of the user processed after initiation of the first payment transaction.

25. The computer program product of claim 20, wherein the program instructions, when executed by at least one processor, cause at least one processor to:
in response to classifying the first payment transaction as potentially fraudulent, automatically cause the first payment transaction to be cancelled.

26. The computer program product of claim 20, wherein the program instructions, when executed by at least one processor, cause the at least one processor to:
- in response to classifying the first payment transaction as potentially fraudulent, automatically cause fulfillment of the product or service associated with the first payment transaction to be delayed or revoked.

27. The computer program product of claim 20, wherein the program instructions, when executed by at least one processor, cause the at least one processor to:
- in response to classifying the first payment transaction as potentially fraudulent, automatically communicate the verification request to the device associated with the user to cause the user to indicate whether the first payment transaction is fraudulent.

\* \* \* \* \*